(12) United States Patent
Sallam (10) Patent No.: US 8,527,978 B1
(45) Date of Patent: Sep. 3, 2013

(54) SYSTEM, METHOD, AND COMPUTER PROGRAM PRODUCT FOR POPULATING A LIST OF KNOWN WANTED DATA

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 1050 days.

(21) Appl. No.: 12/059,937

(22) Filed: Mar. 31, 2008

(51) Int. Cl.
*G06F 9/44* (2006.01)

(52) U.S. Cl.
USPC ........... 717/168; 717/169; 717/170; 713/161; 713/178; 726/11

(58) Field of Classification Search
USPC ...... 713/161–179; 717/168–178; 726/11–13
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2006/0150256 A1* | 7/2006 | Fanton et al. | 726/27 |
| 2006/0200658 A1* | 9/2006 | Penkethman | 713/2 |
| 2008/0104130 A1 | 5/2008 | Sallam | 707/200 |
| 2008/0109906 A1 | 5/2008 | Sallam | 726/24 |
| 2008/0126437 A1* | 5/2008 | Chiba | 707/201 |
| 2008/0127344 A1 | 5/2008 | Sallam | 726/23 |
| 2008/0171556 A1* | 7/2008 | Carter | 455/456.1 |
| 2008/0222604 A1* | 9/2008 | Murphy | 717/120 |
| 2011/0029772 A1* | 2/2011 | Fanton et al. | 713/165 |
| 2011/0173693 A1* | 7/2011 | Wysopal et al. | 726/19 |

OTHER PUBLICATIONS

"Windows Update Agent API," Microsoft Corporation, build date Feb. 19, 2008 http://msdn2.microsoft.com/en-us/library/aa387099.aspx.
"How to keep your Windows computer up-to-date," Microsoft Corporation, last review Dec. 5, 2007, http://support.microsoft.com/kb/311047.

* cited by examiner

Primary Examiner — Lewis A Bullock, Jr.
Assistant Examiner — Tina Huynh
(74) Attorney, Agent, or Firm — Patent Capital Group (57) ABSTRACT

A system, method, and computer program product are provided for populating a list of known wanted data. In use, an update to data is identified. In addition, a list of known wanted data is populated with the data, in response to the update.

14 Claims, 6 Drawing Sheets

SYSTEM, METHOD, AND COMPUTER PROGRAM PRODUCT FOR POPULATING A LIST OF KNOWN WANTED DATA

FIELD OF THE INVENTION

The present invention relates to data identified as wanted, and more particularly to maintaining a list of data identified as wanted.

BACKGROUND

Traditionally, security systems utilize scanning techniques to determine if data on a system is unwanted (e.g. malware, etc.). However, such scanning techniques have been associated with various limitations. For example, the security systems utilize signature scanning to determine if data is associated with malware. However, signature scanning is resource intensive since data on a system may have to be re-scanned whenever new signatures are available.

In addition, some security systems have utilized a whitelist database in an attempt to assist with signature scanning. However, such whitelist database techniques have also generally exhibited various limitations. For example, since data associated with an operating system or application is updated frequently, the security systems are unable to keep the whitelist database up to date. Furthermore, as yet another example, the security systems are unable to effectively determine which data should be added to the whitelist database.

There is thus a need for addressing these and/or other issues associated with the prior art.

SUMMARY

A system, method, and computer program product are provided for populating a list of known wanted data. In use, an update to data is identified. In addition, a list of known wanted data is populated with the data, in response to the update.

DETAILED DESCRIPTION

Figure 1:
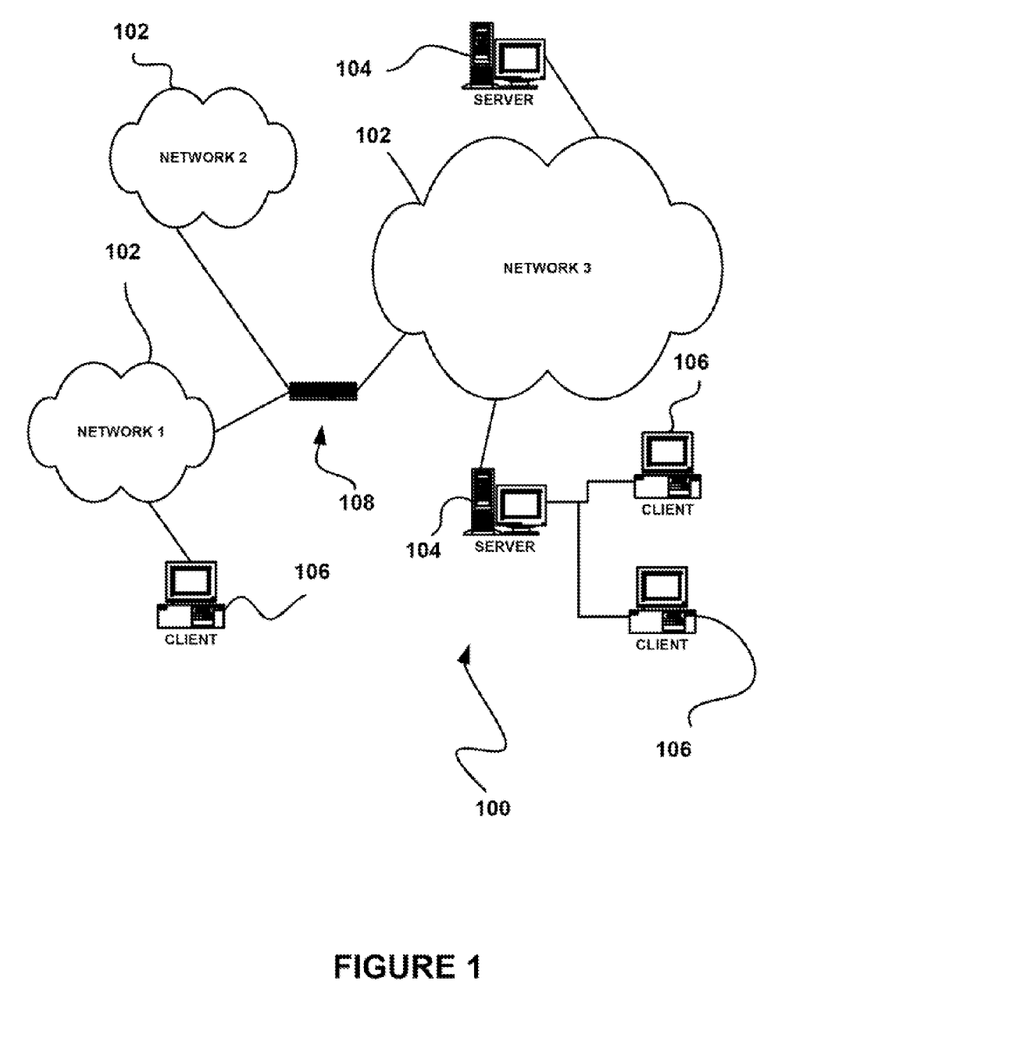
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
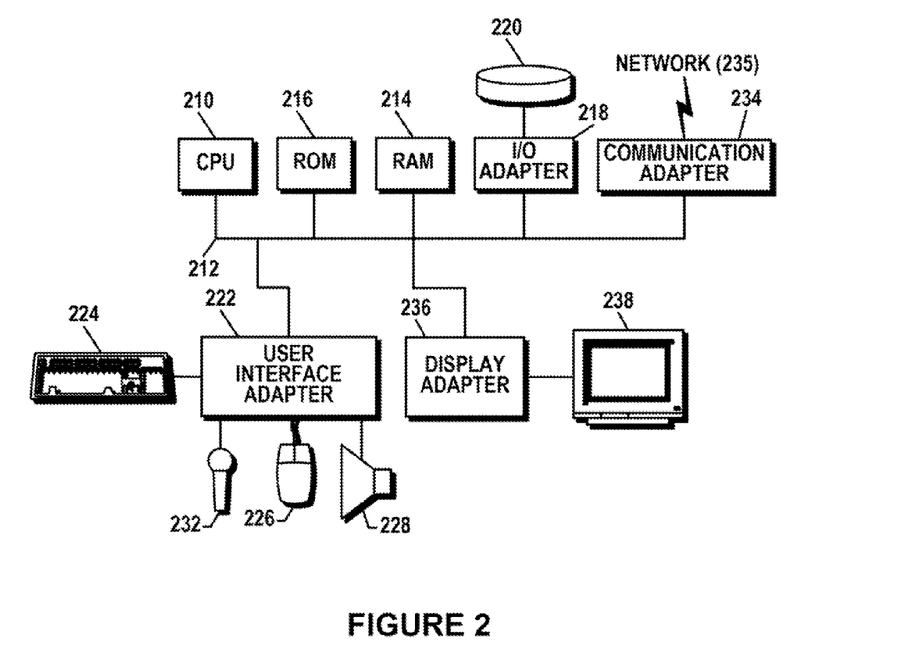
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown, in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
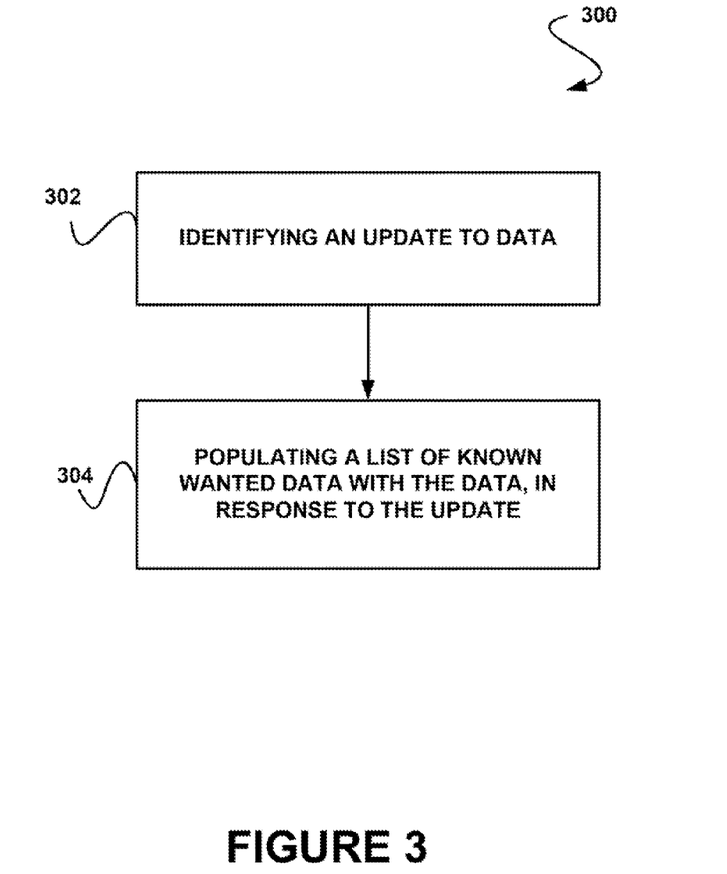
FIG. 3 illustrates a method for populating a list of known wanted data, in accordance with one embodiment.

FIG. 3 illustrates a method 300 for populating a list of known wanted data, in accordance with one embodiment. As an option, the method 300 may be carried out in the context of the architecture and environment of FIGS. 1 and/or 2. Of course, however, the method 300 may be carried out in any desired environment.

As shown in operation 302, an update to data is identified. In one embodiment, the data may refer to any executable data capable of being updated. As an option, the data may include a file or a module. For example, the file or the module may be associated with an operating system, an application, a process, etc. Optionally, the file or the module may include a driver, a library, a dynamic link library, an executable, a portable executable, a registry, a configuration, etc. As another option, the data may include data predetermined to be wanted (e.g. predetermined to exclude malware, data received from a trusted source, etc.).

In one embodiment, the update may include any modification, change, etc. applied to the data. The update to the data may be performed utilizing update data. As an option, the update data may include a package. For example, the package may include a setup program, at least one file, a script, and/or any other data associated with the update to the data.

In another embodiment, a setup program may update the data. As an example, the setup program may include any application capable of updating the data. Further, as yet another option, the setup program may be utilized to locate update data utilized for updating the data. For example, the setup program may search a location to locate the update data. As an option, the location may be identified by a uniform resource locator (URL), an internet protocol (IP) address, a domain name, etc.

Still yet, the update to the data may be identified in any desired manner. In one embodiment, the update to the data may be identified based on a call to a service to install the update. Further, as yet another option, the call may be associated with the setup program. In yet another embodiment, the update to the data may be identified based on a call to a service to download the update. Optionally, downloading may include copying, reading, transferring, etc.

As an option, the service may include an application, a process, a program, a task, etc. Optionally, the service may include an object interface. For example, the object interface may include any application programming interface, handle, function, etc. capable of being utilized to access the service. Further, as yet another option, the object interface may be utilized to communicate, interact, interface, etc. with the service.

In still yet another embodiment, the update may be identified utilizing a proxy interface. As an option, the proxy interface may include a profiling agent. Optionally, the proxy interface may monitor an operating system, an application, a service, etc. For example, the proxy interface may monitor actions, modifications, operations, updates, etc. performed by the service for identifying the update.

Further, in one embodiment, the proxy interface may include a plurality of components. As an option, each component may monitor different operations. For example, each component may include a file system component, a registry component, a process component, a network component, an interface component, an installer component, and/or a downloader component.

As shown in operation 304, a list of known wanted data is populated with the data, in response to the update. In one embodiment, the list of known wanted data may list executable data that is wanted. Further, in another embodiment, the list of known wanted data may include a whitelist. Optionally, the list of known wanted data may be stored in a database, a file, memory, and/or any other data structure capable of storing the list. As an option, the list of known wanted data may include data predetermined to be wanted (e.g. predetermined to exclude malware, etc.). In one embodiment, the list of known wanted data may be utilized by a security system for determining whether data unknown to be wanted or wanted is in fact wanted (e.g. by comparing such data to the list of known wanted data, etc.).

As an option, populating the list with the data may include populating the list with the entire data to which the update was applied. Of course, as another option, the list may only be populated with only a portion of the data modified by the update. For example, the list may be populated with the update data utilized to update with the data.

In still yet another embodiment, a signature of the data may be computed. Optionally, the signature may include a hash of the data. As an option, the hash may be generated by a message-digest algorithm 5 (MD5) algorithm, a cyclic redundancy check (CRC) algorithm, secure hash algorithm (SHA) algorithm, or any other method of generating a hashed value. Further, as an option, the list of known wanted data may be populated with the computed signature associated with the data.

In one embodiment, the list of known wanted data may be populated with metadata associated with the data. Optionally, the metadata may include a version of the data, a digital signature used to sign the data, a location of the data (e.g., a location from which the data was received), a format type of the data, a time of the update to the data, and/or any other attributes associated with the data.

Further, as another option, the metadata may be associated with the setup program that updated the data. For example, the metadata associated with the setup program may include an application name, version information, a digital signature, an install location, and/or associated configuration data. Optionally, the associated configuration data may include registry entries, configuration file values, etc. In one embodiment, the metadata may be utilized for security auditing, risk management, etc.

To this end, a list of known wanted data may be automatically populated with data that has been updated, in response to such update. Thus, the list of known wanted data may be populated according to all updates (e.g. by any update provider, etc.). In one embodiment, the list of known wanted data may be particular to the system (e.g. the operating system, applications, etc. installed on such system) on which the data that has been updated. For example, by populating the list in response to the update to the data, the list may be particular to the data. By, creating the list of known unwanted data particular to the system creation and storage of a centralized list of known wanted data particular to a plurality of systems may be avoided.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
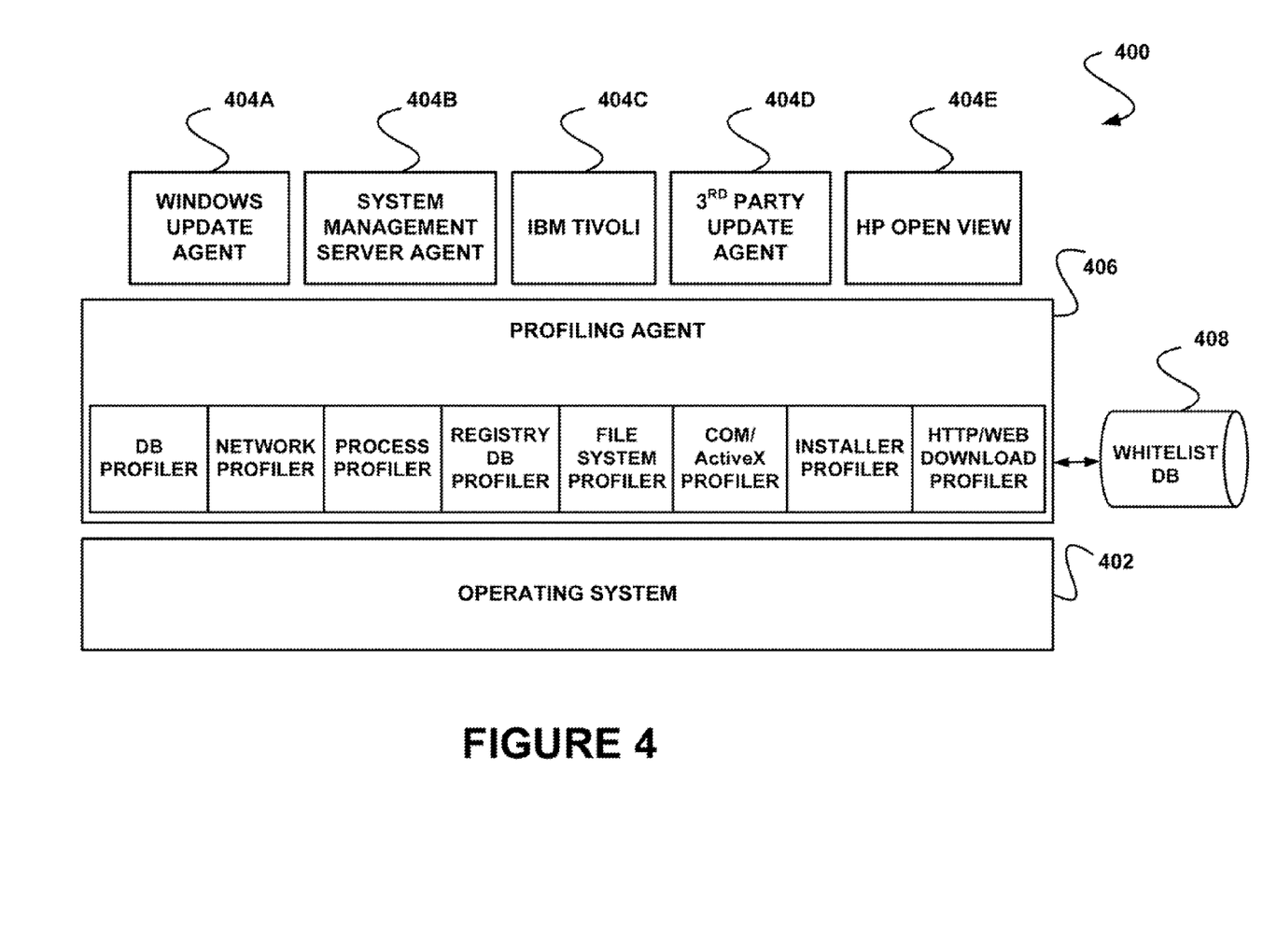
FIG. 4 illustrates a system for monitoring at least one update service utilizing a profiling agent, in accordance with another embodiment.

FIG. 4 illustrates a system 400 for monitoring at least one update service utilizing a profiling agent, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

The system 400 includes an operating system 402 and a plurality of update services 404A-E, as shown. As an option, each update service 404A-E may include a software distribution and/or management system. Optionally, the update service 404A-E may check for new and/or updated data. As another option, the update service 404A-E may download the new and/or updated data. Still, as yet another option, the update service 404A-E may install the new and/or updated data. For example, the new and/or updated data may include at least one application, file, configuration file, data file, library, driver, executable, package, etc.

In still yet another embodiment, each update service 404A-E may be associated with a particular vendor. Optionally, the update service 404A-E may update data associated with the particular vendor. As yet another option, the update service 404A-E may update data associated with another vendor. For example, the update service 404A-E may include a Windows® Update Agent 404A, a System Management Server Agent 404B, IBM® Tivoli, 404C, HP™ Open View 404E, a HP™ updater, an IBM® updater, a Sony™ updater, or any $3^{rd}$ party update agent 404D.

Further, the system 400 includes a profiling agent 406. In one embodiment, the profiling agent 406 may be associated with at least one update service 404A-E. For example, the profiling agent 406 may be hooked to each update service 404A-E. Additionally, as another option, the profiling agent 406 may act as a proxy between each update service 404A-E and the operating system 402. As an example, a call to the update service 404A-E may be proxied by the profiling agent 406 to the update service 404A-E. Additionally, as another example, the profiling agent 406 may intercept a call from the update service 404A-E to the operating system 402.

In addition, the system 400 includes a whitelist database 408, as shown. As an option, the whitelist database 408 may be coupled to the profiling agent 406. It should be noted that the whitelist database 408 may include a hash, a file, a list, a database, an extensible markup language (XML) file, an extensible markup language (XML) database, and/or any other data structure capable of storing a whitelist. Optionally, the whitelist database 408 may be locally coupled to the profiling agent 406. Further, as an option, the whitelist database 408 may be remotely coupled to the profiling agent 406.

In yet another embodiment, the whitelist database 408 may include data and/or metadata associated with each file added and/or updated by the update service 404A-E. For example, the profiling agent 406 may update the whitelist database 408 with data and/or metadata identified by hooking each update service 404A-E. Optionally, the profiling agent 406 may generate additional metadata based on the data identified. As an example, the profiling agent 406 may generate a signature for a file and may further update the whitelist database 408 with the name of the file and the associated signature.

In one embodiment the profiling agent 406 may include multiple components (e.g. a database profiler, a network profiler, etc.). Optionally, each component may monitor operations performed by the update service 404A-E. As an example, the update service 404A-E may request an operation associated with the operating system 402. Further, as yet another option, each component may monitor operations requested of the update service 404A-E. For example, an application may request an operation from the update service 404A-E. As an option, each component may monitor a particular aspect of the update service 404A-E.

For example, in one embodiment, the profiling agent 406 may include a database profiler. As an option, the database profiler may monitor for database operations performed by the update service 404A-E. For example, any database operation performed by the update service 404A-E may be identified. As another example, metadata associated with the identified database operation performed may be provided. Optionally, the metadata associated with the identified database operation may include a database name, a database table, database records, database names, a database key, a database query, etc. associated with the database operation.

In yet another embodiment, the profiling agent 406 may include a network profiler. As another option, the network profiler may monitor network operations performed by the update service 404A-E. As yet another option, the network profiler may intercept network operations performed by the update service 404A-E. For example, if the update service 404A-E performs a download operation to download a setup package, metadata associated with the setup package may be identified. Optionally, the metadata associated with the setup package may include a download source location, a name, a version, a filename, a publisher, a distributor, a digital signature, a format, a date, a time, etc. As another option, the download source location may include a web site domain name, a web site internet protocol (IP) address, a uniform resource locator (URL), a path, etc.

Further, in still yet another embodiment, the profiling agent 406 may include a process profiler. As another option, the process profiler may monitor process operations performed by the update service 404A-E. Optionally, the process profiler may intercept a call from the update service 404A-E. Further, as yet another option, the call from the update service 404A-E may be to another application, service, operating system, library, driver, etc. For example, the process profiler may intercept a call from the update service 404A-E to an install service to install a file.

In one embodiment, the profiling agent 406 may include a registry database profiler. In addition, as an option, the registry database profiler may intercept a call to a registry from the update service 404A-E. Optionally, the registry database profiler may track entries modified, created, and/or deleted associated with the call. For example, the entries associated with the call may be included in the metadata.

Additionally, in another embodiment, the profiling agent 406 may include a file system profiler. Optionally, the file system profiler may intercept a call from the update service 404A-E associated with a file. Further, as yet another option, the call may be from the update service 404A-E to the operating system 402. As an option, the call may be associated with a file operation. For example, a file operation may include a file open operation, a file read operation, a file write operation, a file delete operation, a file move operation, a file copy operation, a file rename operation, etc.

Furthermore, in yet another embodiment, the profiling agent 406 may compute a signature associated with the file operation. Optionally, the signature may be computed for each file operation from the update service 404A-E monitored by the file system profiler. For example, after a file write operation from the update service 404A-E to the operating system 402 is intercepted, the profiling agent 406 may generate a checksum associated with the file affected by the file write operation. In addition, as yet another option, the signature associated with the file may be added and/or updated in the whitelist database 408. Optionally, the metadata associated with the file and/or the update service 404A-E may be further associated with the file in the whitelist database 408.

Still, in yet another embodiment, the profiling agent 406 may include a component object model (COM) profiler. Optionally, the COM profiler may include an ActiveX® profiler. Further, as another option, the COM profiler may track calls to instantiate a COM object. For example, the COM object may be utilized to update data.

In still yet another embodiment, the profiling agent 406 may include an installer profiler. As an option, the installer profiler may track and/or identify all data added and/or updated by an installer. Optionally, the installer may include a setup program. As yet another option, the installer may include a setup package. Further, as one option, the installer profiler may compute a signature for each file added and/or updated by the installer. In one embodiment, the installer profiler may extract files from the installer, and may further compute a signature for each file included in the installer. Additionally, the installer profiler may add/update each file, the associated signature, and any metadata associated with the file into the whitelist database 408. Optionally, the installer profiler may update an existing entry in the whitelist database 408 associated with file.

Further, in one embodiment, the profiling agent 406 may include a web download profiler. As an option, the web download profiler may include a hypertext transfer protocol (HTTP) profiler. Optionally, the web download profiler may identify all data downloaded. For example, the web download profiler may identify data downloaded by an application associated with the operating system 402. Further, the web download profiler may identify an installer associated with the downloaded data. Further, the web download installer may compute a signature for each file included in the installer. Additionally, the installer profiler may update the whitelist database 408 with the file and associated metadata.

Additionally, in another embodiment, the metadata added to the whitelist database 408 may include various characteristics associated with an updated file and/or data. As an option, the metadata may include a version identifier associated with the file. For example, the file may include the version identifier.

Further, as yet another option, the metadata may include a format type of the file. As an example, the format type of the file may include portable executable (PE), dynamic link library (DLL), system device driver (SYS), etc. Optionally, the metadata may include fields specific to the format type. For example, the fields may include header fields associated with a portable executable file.

In addition, as another option, the metadata may include a signature computed from the file. As an example, the signature may include any hash capable of identifying the file. In addition, as an option, the metadata may include a location and/or uniform resource locator (URL) identifying the download source of the file. Optionally, the file may be included in a setup package, and therefore, the associated location and/or uniform resource locator may indicate the download source of the setup package.

Furthermore, as still yet another option, the metadata may include a date and/or time the file was updated. For example, the metadata may include the date and time that the installer profiler identified an installer updating a file. Still yet, as an option, the metadata may include characteristics associated with the installer such as an application name, a version, a digital signature, a location, and associated registry database entries. Optionally, the associated registry database entries may include the major database entries associated with the installer.

Figure 5:
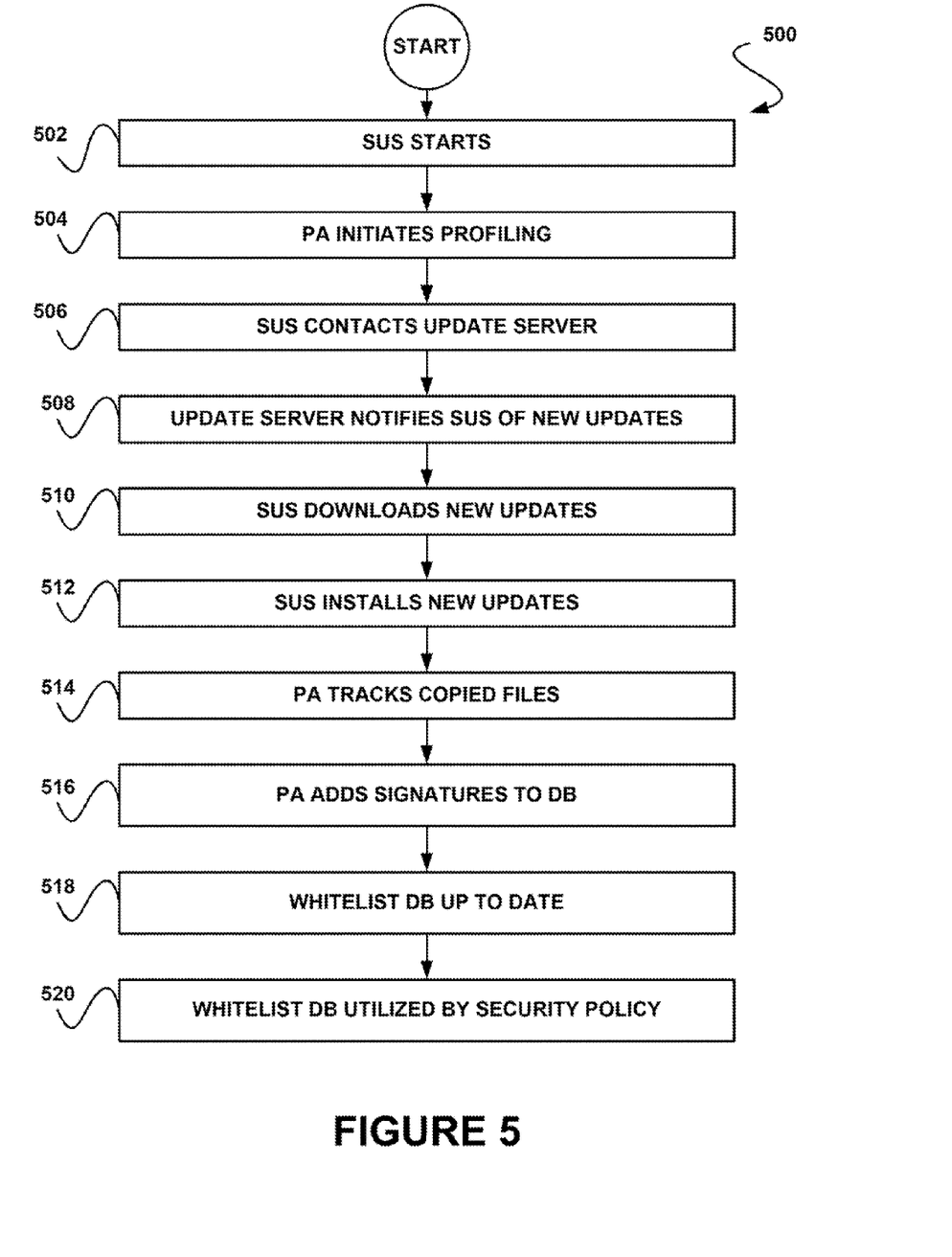
FIG. 5 illustrates a method for updating a whitelist database utilizing a profiling agent, in accordance with yet another embodiment.

FIG. 5 illustrates a method 500 for updating a whitelist database utilizing a profiling agent, in accordance with yet another embodiment. As an option, the method 500 may be carried out in the context of the architecture and environment of FIGS. 1-4. For example, the method 500 may be carried out utilizing the profiling agent 406 of FIG. 4. Of course, however, the method 500 may be carried out in any desired environment. It should also be noted that the aforementioned definitions may apply during the present description.

As shown in operation 502, a software update system (SUS) starts. Optionally, the software update system may include any system for updating software. For example, the software update system may include a Windows® software update system or agent. For example, the SUS may start for updating data.

Further, as shown in operation 504, a profiling agent (PA) initiates profiling. Optionally, initiating the profiling may include hooking the profiling agent onto the software update system. As an option, the hooking may allow the profiling agent to intercept all calls to and/or from the software update system. For example, hooking the profiling software update system may allow the profiling agent to intercept all calls to an operating system.

In addition, the software update system contacts an update server. See operation 506. For example, the update server may include a Windows® update server. The update server may store update data for updating software. As an option, the software update system may indicate to the update server at least one file, application, or other software that may be updated. Such indication may be included in any type of message sent from the software update system to the update server.

Further, as shown in operation 508, the update server notifies the software update system of new updates. Optionally, the update server may notify the software update system of new updates via a message, an alert, a notification, etc. For example, the notification may include a push notification from the update server to the software update system. In one embodiment, the update server may notify the software update system of at least one update for the software indicated to the update server by the software update system in operation 506.

In addition, as shown in operation 510, the software update system downloads the new updates. As an option, downloading the new updates may include transferring, pulling, etc. the new updates from the update server to the software update system. For example, after the update server notifies the software update system of new updates, the software update system may download the new updates from the update server as a setup package.

Furthermore, the software update system installs the new updates, as shown in operation 512. As an option, the software update system may call a service to install the new updates. Optionally, the software update system may call an installer to install the new updates. Still, in one embodiment, the profiling agent may intercept the call to install the new updates.

Additionally, the profile agent tracks copied files. See operation 514. The copied files may include any files associated with the new updates. Further, as an option, the profile agent may track copied files by intercepting the calls from the software update system. For example, by tracking the files copied by the software update system, the profile agent may identify which files to add and/or update in the whitelist database. In another embodiment, the profile agent may generate a signature for each copied file. As an example, the profile agent may utilize a secure hash algorithm (SHA) algorithm to generate a signature of each copied file.

Further, as shown in operation 516, the profile agent adds signatures to the database. For example, the whitelist database may be updated with the signature generated by the profile agent for each copied file. Optionally, the profile agent may determine metadata associated with each copied file. In addition, as yet another option, the whitelist database may be updated with the metadata associated with each copied file. For example, the profile agent may determine metadata associated with each copied file such as a version of each copied file, a web site and uniform resource locator (URL) source for each copied file, a type of each copied file, headers associated with each copied file, and/or the date and time each copied file was updated. As another option, metadata associated with the software update system may be included in the update to the whitelist database for each copied file.

Still yet, the whitelist database is up to date, as shown in operation 518. Optionally, after the software update system copies the new updates and updates the data and associated metadata for each copied file in the whitelist database, the whitelist database may be up to date. For example, by utilizing the data and metadata associated with each copied file from the new updates, the whitelist database may include up to date data and metadata for each file copied via a trusted source. As yet another option, the trusted source may include the software update system. Further, as an option, each trusted source may be indicated in the whitelist database.

In addition, the whitelist database is utilized by a security policy. See operation 520. In another embodiment, the security policy may define security aspects of a system. As an option, the security policy may be hooked into the operating system. Optionally, hooking the security policy into the operating system may allow the security policy to be utilized for approving and/or disapproving calls associated with the operating system.

In another embodiment, by utilizing the whitelist database, the security policy may be able to identify trusted files. As an option, the security policy may be able to identify the source of a call to the operating system as originating from a trusted source. For example, a call to the operating system from the software update system may be identified as a trusted source by utilizing the whitelist database.

In yet another embodiment, the security policy may be utilized to block the execution of a file that is determined to be an untrusted application. For example, if the file is not in the whitelist database, the security policy may block execution of the file.

Further, in still yet another embodiment, the security policy may be utilized to protect files from being modified by an untrusted source. As an example, if a file write call is received from an application, the security policy may utilize the whitelist database to determine if the application is trusted. Further, in the context of the current example, the security policy may block the file write call if the application is determined to be untrusted (e.g. not included in the whitelist database).

Still yet, in one embodiment, the security policy may be utilized to verify an update to a file. For example, the update to a file may be associated with an attack on the operating system by malware that attempts to modify critical operating system files. Optionally, if the source of the update to the file is determined to be a trusted source by utilizing the whitelist database, then the update to the file may be permitted. Further, as another option, if the source of the update to the file is determined to be an untrusted source by utilizing the whitelist database, then the update to the file may be denied.

Figure 6:
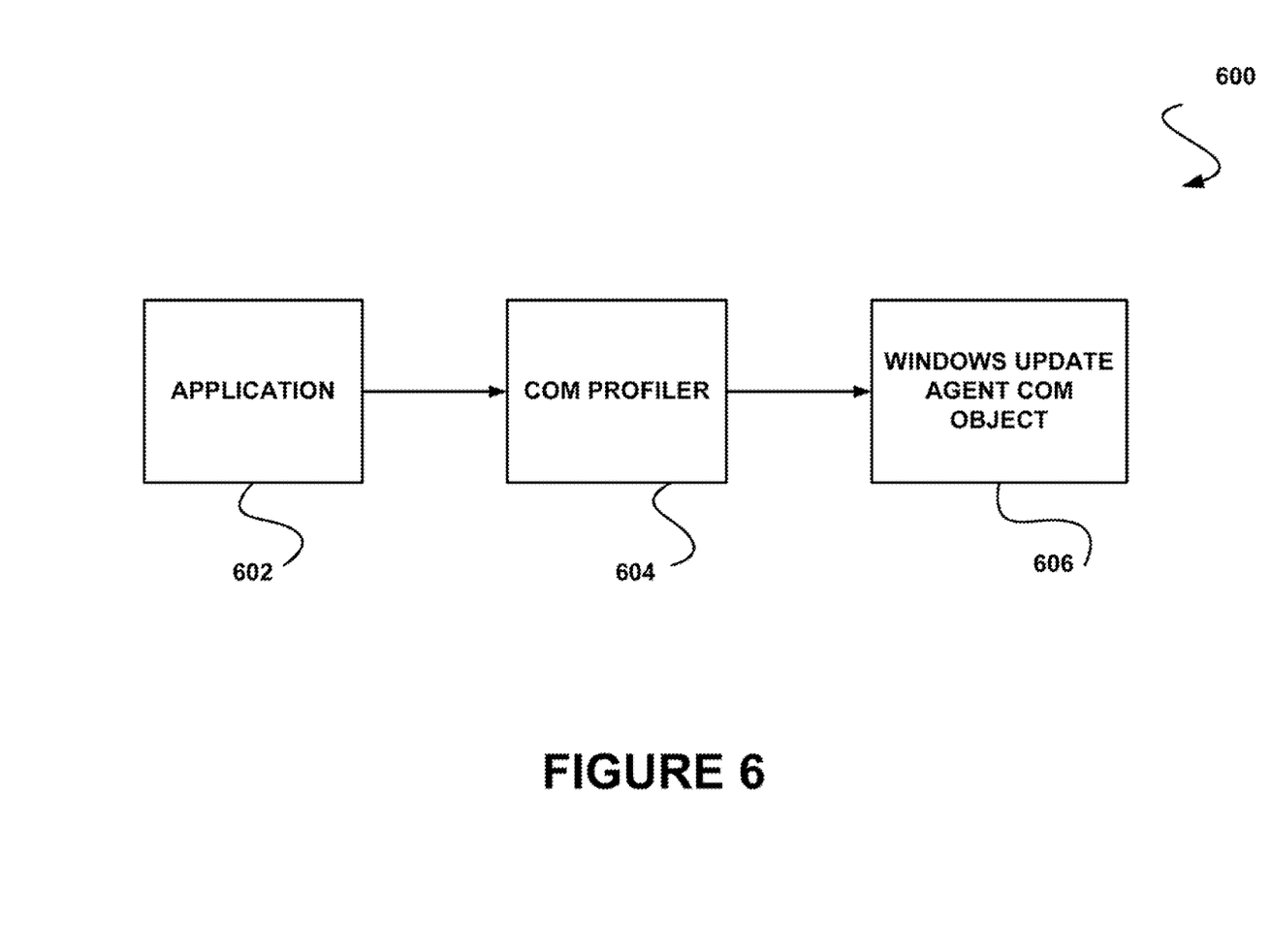
FIG. 6 illustrates a system for monitoring a component object model object utilizing a profiling agent, in accordance with still yet another embodiment.

FIG. 6 illustrates a system 600 for monitoring a component object model object utilizing a profiling agent, in accordance with still yet another embodiment. As an option, the system 600 may be implemented in the context of the architecture and environment of FIGS. 1-5. Of course, however, the system 600 may be implemented in any desired environment. It should also be noted that the aforementioned definitions may apply during the present description.

As shown, the system 600 includes an application 602, a component object model (COM) profiler 604, and a Windows® Update Agent COM object 606. As an option, the Windows® Update Agent COM object 606 may include a set of COM object interfaces. For example, the set of COM object interfaces may provide access to a feature of the Windows® Update Agent. Optionally, the COM object interfaces may be utilized to update a file.

In one embodiment, the component object model profiler 604 may be hooked into the Windows® Update Agent COM object 606. For example, by hooking the Windows® Update Agent COM object 606, the component object model profiler 604 may act as a proxy to the Windows® Update Agent COM object 606.

In another embodiment, the application 602 may call to instantiate an interface of the Windows® Update Agent COM object 606. As an option, the component object model profiler 604 may intercept the call to instantiate the interface of the Windows® Update Agent COM object 606 by the application, 602. For example, the application 602 may instantiate the interface of the Windows Update Agent™ COM object 606 in order to initiate an update of operating system files.

Further, in yet another embodiment, after intercepting the call to instantiate the interface of the Windows® Update Agent COM object 606, the component object model profiler 604 may initiate a profiling agent to identify and track files modified by an update. Further, as yet another option, the profiling agent may update a whitelist database with data and metadata associated with files updated by the Windows® Update Agent COM object 606 (e.g. utilizing the method 500 of FIG. 5).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory tangible computer readable medium for performing operations, comprising:

using a profiling agent to monitor a plurality of update services that are associated with multiple update providers, wherein the profiling agent includes a proxy interface;

identifying an update for a computer using the proxy interface, wherein the proxy interface is configured to monitor operations performed by an operating system and one or more applications of the computer for identifying the update;

downloading the update;

populating a list of known wanted data with at least a portion of update data provided in the update, wherein the list reflects an aggregation of multiple update data sets from the multiple update providers and the list is based, at least in part, on the operating system and applications of the computer, and wherein the portion of the update data are reflective of data predetermined to exclude malware, and wherein the known wanted data includes a whitelist;

populating the list of known wanted data with metadata that indicates a version of the update data, a digital signature used to sign a portion of the update data, and a location from which the portion of the update data was received;

installing the update;

tracking copied files by the profiling agent; and updating a whitelist database with the digital signature generated by the profiling agent.

2. The computer program product of claim 1, wherein the portion of the update data includes an executable file.

3. The computer program product of claim 2, wherein the file includes an operating system file.

4. The computer program product of claim 2, wherein the file includes an application filed.

5. The computer program product of claim 1, wherein the portion of the update data is updated by a setup program.

6. The computer program product of claim 1, wherein the update is identified based on a call to a service to install the update.

7. The computer program product of claim 1, wherein the update is identified based on a call to a service to download the update.

8. The computer program product of claim 7, wherein the service includes an object interface.

9. The computer program product of claim 1, wherein the proxy interface includes a plurality of components, each component monitoring different operations.

10. The computer program product of claim 9, wherein the components include at least one of a file system component, a registry component, a process component, and a network component.

11. The computer program product of claim 1, wherein the metadata includes at least one of a format type of the portion of the update data, and a time of the update.

12. A method, comprising:
  using a profiling agent to monitor a plurality of update services that are associated with multiple update providers, wherein the profiling agent includes a proxy interface;
  identifying an update for a computer using the proxy interface, wherein the proxy interface is configured to monitor operations performed by an operating system and one or more applications of the computer for identifying the update;
  downloading the update;
  populating a list of known wanted data with at least a portion of update data provided in the update, wherein the list reflects an aggregation of multiple update data sets from the multiple update providers and the list is based, at least in part, on the operating system and applications of the computer, and wherein the portion of the update data are reflective of data predetermined to exclude malware, and wherein the known wanted data includes a whitelist;
  populating the list of known wanted data with metadata that indicates a version of the update data, a digital signature used to sign a portion of the update data, and a location from which the portion of the update data was received;
  installing the update;
  tracking copied files by the profiling agent; and
  updating a whitelist database with the digital signature generated by the profiling agent.

13. A system, comprising:
  a processor;
  a memory; and
  a profiling agent, wherein the system is configured for:
    using the profiling agent to monitor a plurality of update services that are associated with multiple update providers, wherein the profiling agent includes a proxy interface;
    identifying an update for a computer using the proxy interface, wherein the proxy interface is configured to monitor operations performed by an operating system and one or more applications of the computer for identifying the update;
    downloading the update;
    populating a list of known wanted data with at least a portion of update data provided in the update, wherein the list reflects an aggregation of multiple update data sets from the multiple update providers and the list is based, at least in part, on the operating system and applications of the computer, and wherein the portion of the update data are reflective of data predetermined to exclude malware, and wherein the known wanted data includes a whitelist;
    populating the list of known wanted data with metadata that indicates a version of the update data, a digital signature used to sign a portion of the update data, and a location from which the portion of the update data was received;
    installing the update;
    tracking copied files by the profiling agent; and
    updating a whitelist database with the digital signature generated by the profiling agent.

14. The system of claim 13, wherein the processor is coupled to the memory via a bus.

* * * * *